L. DREYFUS & F. HILLEBRAND.
ALTERNATING CURRENT DYNAMO ELECTRIC MACHINE.
APPLICATION FILED SEPT. 4, 1912.

1,115,289.

Patented Oct. 27, 1914.

2 SHEETS—SHEET 1.

Witnesses
Chas. Stokes
J. Ellis Glen

Inventors
Ludwig Dreyfus.
Franz Hillebrand
by Albert G. Davis
Their Attorney

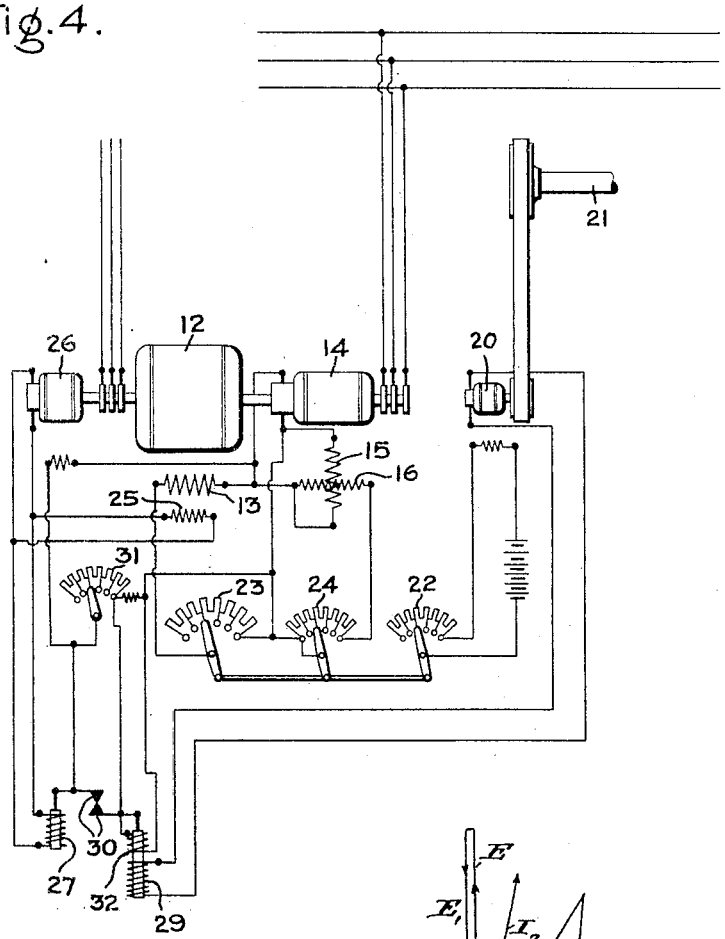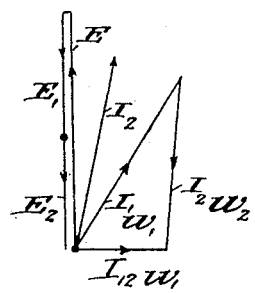

UNITED STATES PATENT OFFICE.

LUDWIG DREYFUS AND FRANZ HILLEBRAND, OF NIEDERSCHÖNHAUSEN, GERMANY, ASSIGNORS TO GENERAL ELECTRIC COMPANY, A CORPORATION OF NEW YORK.

ALTERNATING-CURRENT DYNAMO-ELECTRIC MACHINE.

1,115,289. Specification of Letters Patent. Patented Oct. 27, 1914.

Application filed September 4, 1912. Serial No. 718,504.

*To all whom it may concern:*

Be it known that we, LUDWIG DREYFUS, a subject of the King of Great Britain, and FRANZ HILLEBRAND, a subject of the King of Prussia, residing at Niederschönhausen, Germany, have invented certain new and useful Improvements in Alternating-Current Dynamo-Electric Machines, of which the following is a specification.

Our invention relates to alternating current dynamo electric machines of the polyphase type, and particularly to such machines in which both members are supplied with alternating current.

If a polyphase dynamo electric machine has an armature provided with a commutator and a compensating winding on the stationary member with substantially the same number of turns as the armature and if the armature and the compensating field winding are connected in series, the fields produced by the armature and field winding are opposed to each other in phase and thus substantially neutralize each other. If it is attempted to operate such a machine as a motor, it will not be capable of producting any torque at starting, or if operated as a generator it will not produce any voltage.

Our invention has for its object to change such a dynamo electric machine into an operative one having a shunt characteristic in a novel and simple manner, and also to control the speed of a machine of this type when operated as a motor. In accordance with our invention, we create an exciting field for such a machine by shifting the phase of the current in the compensating winding by means of a synchronous motor connected in shunt to the armature.

Other features of our invention will be pointed out with particularity in the claims annexed to and forming part of this specification.

For a better understanding of our invention, reference may be had to the following description taken in connection with the accompanying drawings, in which—

Figure 1:
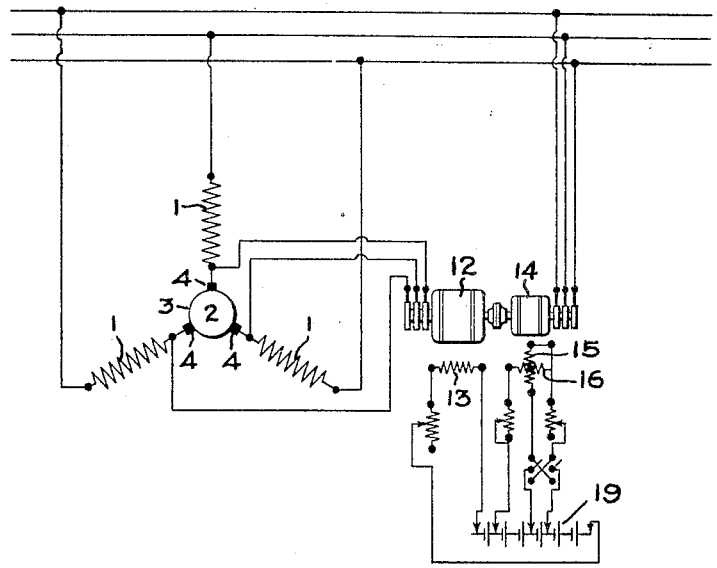
Figure 3:
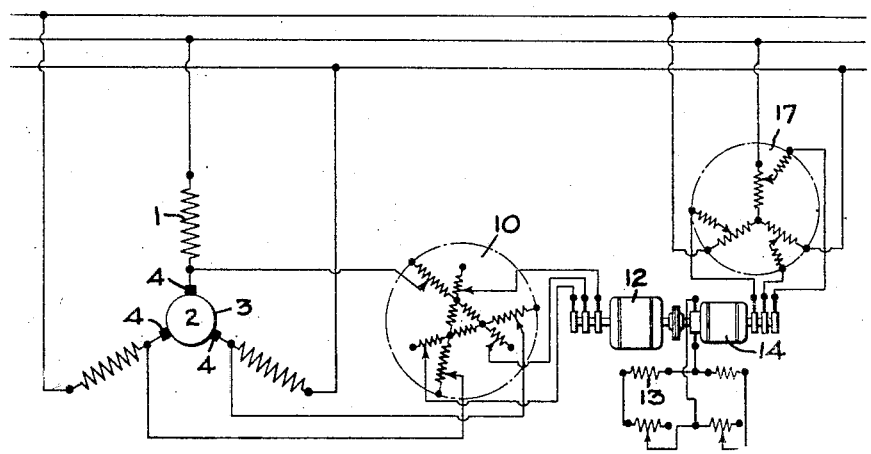

Figure 1 shows diagrammatically a three-phase commutator motor arranged in accordance with our invention; Fig. 2 is an explanatory diagram; Fig. 3 shows a modification of the motor of Fig. 1; and Fig. 4 shows a regulating mechanism for the motor of Fig. 1.

Like letters of reference will be used throughout this specification and the drawings to indicate similar parts.

Referring to the drawings, 1 is the compensating winding on the stationary member of a three-phase commutator motor and 2 is the rotary member or armature provided with a commutator 3 on which brushes 4 bear. The compensating winding is connected to the brushes 4 either directly or through a transformer so as to be in series with the armature. In order to change such a motor into one having a shunt characteristic, or, in other words, to control its speed, we connect a synchronous motor 12 in shunt to the brushes 4 of the alternating current commutator motor. By using a synchronous motor in this way it is possible to regulate the alternating current commutator motor by regulating the field of the synchronous motor and consequently the regulating devices become quite simple, as does also the transition from operation above synchronism to that below synchronism. If each phase of the compensating winding 1 is directly in line with the corresponding brush 4, by which we mean the armature reaction is equal and opposite in phase to the field produced by the compensating winding when the same current flows in both the armature and compensating winding, the apparent reactance of the alternating current winding of the synchronous motor will shift the phase of the current in the compensating winding relatively to that in the armature to create an exciting field.

If $I_1$ represents the current in the compensating winding, $W_1$ the number of turns in the compensating winding, $I_2$ the armature current, $W_2$ the number of armature turns which are considered as negative since they should be connected in opposition to the positive turns $W_1$ of the compensating winding and $I_2$ the current in the alternating current winding of synchronous motor 12, which we have illustrated as lagging, then, as shown in Fig. 2, $I_1$ and $I_2$, or the corresponding ampere turns $I_1 W_1$ and $I_2 W_2$ include an angle which corresponds to the creation of mechanical torque, and $I_{12} W_1$ represents the exciting ampere turns. If the vector E in Fig. 2 represents the supply voltage, then neglecting the fall of potential in consequence of leakage and ohmic resistance, the sum of the voltages $E_1$ and $E_2$ induced in the compensating winding and in the armature, respectively, is equal to the supply voltage E.

By varying the excitation of the synchronous motor 12, it is possible to vary the apparent reactance of its alternating current winding at will. If the field winding 13 of the synchronous motor 12 is not excited at all, or is under excited, the synchronous motor acts like an inductive load as is well known. With the field winding 13 over-excited on the contrary, the synchronous motor receives leading current. When the synchronous motor acts as an inductive load, the commutator motor will operate at over synchronous speed, and when the synchronous motor receives leading current, the commutator motor will run under synchronous speed. It will thus be seen that by regulating the field of the synchronous motor, the speed of the commutator motor can be varied at will. However, the conditions must be such that the synchronous motor 12 can never fall out of step even when its terminal voltage is very small which will be the case when the commutator motor is passing through synchronism. In order to keep the synchronous motor in step, we provide a second synchronous motor 14 which is coupled with synchronous motor 12 either directly or indirectly by means of a coupling with a constant ratio of transmission. The use of the second synchronous motor 14 is advantageous because the power factor of the three-phase commutator motor is entirely controlled by the angle at which the rotors of the two synchronous motors 12 and 14 are coupled, but since the most advantageous angle of coupling is dependent upon the speed of the commutator motor, it is necessary, in order to always operate it under the most favorable conditions, to relatively change the phase relation of the voltages of the synchronous motors by means of either a rotatable coupling or to arrange the stators of the two synchronous motors so as to be capable of being displaced relative to each other. The same result may also be obtained electrically. In the arrangement of Fig. 1, we have shown the field winding of the motor 14 divided into two parts 15 and 16 displaced with relation to each other so that by varying the excitation of either one or both of the sections 15 and 16, the phase of the voltage of the synchronous motor 16 is shifted relatively to that of the synchronous motor 12. Another method of shifting the phase angle of the voltages of the motors 12 and 14 is shown in Fig. 3, in which a potential regulator 17 is connected between the source of supply and the synchronous motor 14, and a regulable transformer 10 between the brushes 4 of the commutator motor and the synchronous motor 12. The direct current excitation for the synchronous motors 12 and 14 may be taken from a battery 19 as shown in Fig. 1, or any other suitable source of direct current, as, for instance, one of the synchronous motors may be constructed as a rotary converter as shown in Fig. 3.

The speed of a polyphase commutator motor of the type described above, decreases when load is thrown on it and changes with variations in the periodicity of the supply voltage, as does any polyphase shunt motor. This is often satisfactory with certain classes of work, but for other classes of work it is desirable that the speed of the driving motor does not vary with fluctuations in load, etc. By means of a regulator, the speed of the polyphase commutator motor may be held constant notwithstanding variations in load, in the supply voltage, or in the periodicity of the supply voltage. In Fig. 4 we have shown a regulator mechanism for the motor of Fig. 1. In this figure, a small dynamo 20 is connected to the shaft 21 of the commutator motor, and consequently its voltage is proportional to the speed of the commutator motor. The field of the dynamo 20 is varied by means of a rheostat 22, the arms of which is connected to the arms of rheostats 23 and 24, which rheostats are connected in the field windings 13 and 16 of synchronous motors 12 and 14, respectively. These rheostats are adjusted to obtain the proper no load speed of the commutator motor, so that when adjusted, the dynamo 20 generates constant potential.

As explained above, in order to maintain the speed of the commutator motor constant as its load varies, it is necessary to vary the field of the synchronous motor 12. We preferably provide it with a field winding 25 wound differentially with respect to the winding 13. The winding 25 is supplied with current from a small exciter 26, driven at constant speed by the synchronous motors 12 and 14. The armature of this exciter is connected to the coil 27 of a Tirrill regulator (shown diagrammatically) and the armature of the dynamo 20 is connected to the coil 29 of the regulator. The contacts 30 of the regulator open and close a short circuit about the rheostat 31 in the field circuit of exciter 26. As the commutator motor varies in speed, the voltage generated by the dynamo 20 varies, allowing the contacts 30 to be closed or opened for a longer time, thus the field of exciter 26 is varied and consequently the voltage generated by it and the strength of the differential field winding is also varied, which in turn varies the resultant field of the synchronous motor to maintain the speed of the polyphase commutator motor constant. If desired, the Tirrill regulator may be over or under compounded by means of a current coil 32. If this coil over compounds, then with increasing load or with the falling of the voltage or the periodicity of the supply, the regulator will operate to decrease the speed of the commutator motor, but with sudden variations in load, it will adjust itself to the new condition of stability with precision and without oscillations. If the coil 32 under-compounds, the regulator will operate to increase the speed of the commutator motor.

We have used the term "connected to" throughout the specification and claims to mean either a direct connection, or an indirect connection by means of transformers, and we aim in the claims, hereto appended, to cover such a modification as well as any other modifications which do not involve a departure from the spirit and scope of our invention.

What we claim as new and desire to secure by Letters Patent of the United States, is,—

1. In a polyphase alternating current dynamo electric machine, an armature provided with a commutator and brushes, a polyphase compensating winding connected to said brushes, a synchronous motor connected in shunt to said brushes, and means for driving said synchronous motor at synchronous speed.

2. In a polyphase alternating current dynamo electric machine, an armature provided with a commutator and brushes, a polyphase compensating winding connected to said brushes, a synchronous motor connected in shunt to said brushes, and a second synchronous motor for driving said first mentioned synchronous motor at synchronous speed.

3. In a polyphase alternating current dynamo electric machine, an armature provided with a commutator and brushes, a polyphase compensating winding connected to said brushes, a synchronous motor connected in shunt to said brushes, a second synchronous motor for driving said first mentioned synchronous motor at synchronous speed, and means for relatively changing the phase relation of the voltages of said synchronous motors.

4. In a polyphase alternating current dynamo electric machine, an armature provided with a commutator and brushes, a polyphase compensating winding connected to said brushes, a synchronous motor connected in shunt to said brushes, means for varying the field excitation of said synchronous motor, and means for driving said synchronous motor at synchronous speed.

5. In a polyphase alternating current dynamo electric machine, an armature provided with a commutator and brushes, a polyphase compensating winding connected to said brushes, a synchronous motor connected in shunt to said brushes, means for varying the field excitation of said synchronous motor, and a second synchronous motor for driving said first mentioned synchronous motor at synchronous speed.

6. In a polyphase alternating current dynamo electric machine, an armature provided with a commutator and brushes, a polyphase compensating winding connected to said brushes, a synchronous motor connected in shunt to said brushes, means for varying the field excitation of said synchronous motor, a second synchronous motor for driving said first mentioned synchronous motor at synchronous speed, and means for relatively changing the phase relation of the voltages of the synchronous motors.

In witness whereof, we have hereunto set our hands this 20th day of August, 1912.

LUDWIG DREYFUS.
FRANZ HILLEBRAND.

Witnesses:
RICH. NICKLAUS,
FRITZ W. BARTSCH.

---

Corrections in Letters Patent No. 1,115,289.

It is hereby certified that in Letters Patent No. 1,115,289, granted October 27, 1914, upon the application of Ludwig Dreyfus and Franz Hillebrand, of Niederschönhausen, Germany, for an improvement in "Alternating-Current Dynamo-Electric Machines," errors appear in the printed specification requiring correction as follows: Page 1, line 27, for the word "producting" read *producing;* same page, line 100, for the reference-letter "$I_2$," read $I_n$; and that the said Letters Patent should be read with these corrections therein that the same may conform to the record of the case in the Patent Office.

Signed and sealed this 17th day of November, A. D., 1914.

[SEAL.]

R. F. WHITEHEAD,
*Acting Commissioner of Patents.*